(12) United States Patent
Frost et al.

(10) Patent No.: US 11,691,732 B2
(45) Date of Patent: Jul. 4, 2023

(54) MODULAR MULTIPLE-EGRESS DOORS FOR DUAL OCCUPANCY AIRCRAFT PASSENGER SUITES

(71) Applicant: B/E AEROSPACE, INC., Winston-Salem, NC (US)

(72) Inventors: Ian L. Frost, Winston-Salem, NC (US); Shirley E. Govea Bravo, Kernersville, NC (US)

(73) Assignee: B/E Aerospace, Inc., Winston Salem, NC (US)

( * ) Notice: Subject to any disclaimer, the term of this patent is extended or adjusted under 35 U.S.C. 154(b) by 245 days.

(21) Appl. No.: 16/926,285

(22) Filed: Jul. 10, 2020

(65) Prior Publication Data

US 2022/0009636 A1    Jan. 13, 2022

(51) Int. Cl.
    *B64D 11/00*   (2006.01)
    *B64C 1/14*    (2006.01)
    *B64D 11/06*   (2006.01)

(52) U.S. Cl.
    CPC ........ *B64D 11/0023* (2013.01); *B64C 1/1438* (2013.01); *B64C 1/1461* (2013.01); *B64D 11/0606* (2014.12); *B64D 2011/0046* (2013.01)

(58) Field of Classification Search
    CPC ............ B64D 11/0023; B64D 11/0606; B64D 2011/0046; B64C 1/1438; B64C 1/1461; E06B 3/4636; E06B 3/7007; E06B 3/922
    See application file for complete search history.

(56) References Cited

U.S. PATENT DOCUMENTS 4,989,808 A    2/1991  Spraggins et al.
5,584,365 A *  12/1996 Tonna ..................... B66B 13/08
                                                    187/319

(Continued)

FOREIGN PATENT DOCUMENTS

EP            0637429 A1    2/1995
KR     2020110007925 U      8/2011

(Continued)

OTHER PUBLICATIONS

Extended Search Report for European Application No. 21185089.6 dated Dec. 7, 2021, 11 pages.

(Continued)

*Primary Examiner* — Joshua J Michener
*Assistant Examiner* — Cindi M Curry
(74) *Attorney, Agent, or Firm* — Suiter Swantz pc llo (57) ABSTRACT

A dual-occupancy aircraft minisuite incorporating a modular multiple-egress door assembly is disclosed. In embodiments, the dual-occupancy minisuite can accommodate two passengers in enhanced privacy. Access to (and egress from) the minisuite is through the modular multiple-egress door assembly, which provides forward and rear (relative to the egress gap between) sets of outer, intermediate, and inner doors. The outer doors translate laterally along rails in the intermediate doors, and the intermediate doors likewise translate laterally along rails in the inner doors, to open the minisuite for passenger access or direct view (or to close the minisuite for enhanced privacy). The forward and rear sets of doors are proportioned such that when any forward or rear translating door is jammed in a closed position, the remaining egress gap is of sufficient width to provide a distinct and independent emergency egress path for each occupying passenger of at least minimum required width.

12 Claims, 10 Drawing Sheets

(56) References Cited

U.S. PATENT DOCUMENTS

| | | | |
|---|---|---|---|
| 6,186,444 B1 | 2/2001 | Steel | |
| 8,096,342 B2* | 1/2012 | Scruggs | E05D 15/08 |
| | | | 160/218 |
| 8,763,327 B2 | 7/2014 | Harter et al. | |
| 8,910,420 B2 | 12/2014 | Curtis et al. | |
| 9,920,559 B2 | 3/2018 | Druckman et al. | |
| 10,421,546 B2* | 9/2019 | Dowty | B64D 11/0606 |
| 2006/0170261 A1* | 8/2006 | Baatz | B64D 11/06 |
| | | | 297/245 |
| 2007/0107309 A1* | 5/2007 | Molteni | E05F 17/004 |
| | | | 49/125 |
| 2007/0295862 A1* | 12/2007 | Hupperich | B64D 11/0606 |
| | | | 244/129.1 |
| 2014/0158826 A1* | 6/2014 | Young | B64D 11/02 |
| | | | 244/118.5 |
| 2016/0298370 A1 | 10/2016 | Druckman et al. | |
| 2017/0106980 A1* | 4/2017 | Kuyper | B64D 11/0604 |
| 2018/0223573 A1* | 8/2018 | Wolfe | E05B 47/004 |
| 2018/0281964 A1* | 10/2018 | Carlioz | B64D 11/0606 |
| 2019/0169899 A1 | 6/2019 | Miksza | |
| 2019/0233114 A1* | 8/2019 | Fullerton | B64D 11/0023 |
| 2019/0359338 A1 | 11/2019 | Colletti | |
| 2020/0130840 A1 | 4/2020 | Frost et al. | |

FOREIGN PATENT DOCUMENTS

| | | |
|---|---|---|
| KR | 101728078 B1 | 4/2017 |
| KR | 101946647 B1 | 2/2019 |
| KR | 102056121 B1 | 1/2020 |
| WO | 2019227120 A1 | 12/2019 |

OTHER PUBLICATIONS

Bahrami, Ali, U.S. Department of Transportation Federal Aviation Adminisliation, Advisory Circular, "Emergency Evacuation Demonstrations", Mar. 12, 2012, AC No. 25.803-1A, 25 pages.

Walton, John, "Regulations covering doored business class minisuites evolve", Design Materials in 3D Simona Boltaron, Feb. 28, 2019, https://runwaygirlnetwork.com/2019/02/28/regulations-covering-doored-business-class-mini-suites-evolve/, 7 pages.

* cited by examiner

MODULAR MULTIPLE-EGRESS DOORS FOR DUAL OCCUPANCY AIRCRAFT PASSENGER SUITES

TECHNICAL FIELD

The subject matter disclosed by the instant application is directed generally to aircraft interiors and more particularly to entrance and egress doors for commercial aircraft passenger suites.

BACKGROUND

Single-occupancy minisuites (e.g., high wall suites, other passenger environments partially enclosed from an aircraft passenger cabin) may be found in premium-level seating areas to provide additional privacy to business-class or first-class passengers. The minisuites may be separated from the surrounding passenger cabin by, e.g., walls, screens, partitions, and/or doors that, for example, may be movable to allow passenger entrance and egress or of limited height to allow direct view by cabin crew during taxi, takeoff and landing (TTL) flight phases. While it may be possible, e.g., on larger and widebody aircraft, to design dual-occupancy suites, or minisuites enclosing two passenger seats and designed to seat two passengers in enhanced privacy from the passenger cabin, current commercial aviation regulations in the United States and Europe prohibit such dual-occupancy suites, allowing only single occupancy during TTL phases. For example, minisuites must not provide a required egress path for any passengers other than its occupant, including an emergency egress path accessible by the occupant should any door to the minisuite become jammed in a closed position, e.g., during an emergency landing. It may therefore be desirable for a minisuite capable of accommodating two passengers to comply with any applicable regulations to allow dual occupancy during TTL phases.

SUMMARY

A modular multiple-egress door assembly for a dual-occupancy minisuite in an aircraft passenger cabin is disclosed. In embodiments, the door assembly includes a pair of inner doors, each inner door fixed to a wall of the minisuite and separated by an egress gap allowing passengers to exit the minisuite into the passenger cabin. The egress gap is sufficiently broad (e.g., wide, large) to encompass, independent of each other, both a first egress path and a second egress path, the first egress path allowing a first passenger to exit the minisuite and the second egress path allowing a second passenger to access the minisuite. The pair of inner doors includes a forward and a rear inner door (e.g., relative to the egress gap), both inner doors having one or more inner rails set into them. The door assembly further includes a pair (forward and rear) of intermediate (e.g., middle) doors, both intermediate doors having outer rails set into them. Both intermediate doors include inner sliders which track along the inner rails, allowing the intermediate doors to slide open and closed relative to the inner doors. For example, the intermediate doors have a fully open configuration (e.g., aligned with the corresponding inner doors) and a fully closed configuration (e.g., maximally extending into the egress gap), translating between the two configurations via the inner sliders and inner rails. The door assembly further includes a pair (forward and rear) of outer doors likewise including outer sliders which translate laterally along the outer rails set into the intermediate doors. The outer doors likewise have a fully open configuration aligned with the intermediate doors and a fully closed configuration substantially adjacent to each other across the egress gap, translating between the two configurations via the outer sliders and outer rails.

In some embodiments, when the forward intermediate door is stuck in a closed configuration and the rear intermediate and outer doors are in the open configuration, the first and second egress paths are both at least the required minimum width for emergency passenger egress from the minisuite.

In some embodiments, when the forward outer door is stuck in a closed configuration and the rear intermediate and outer doors are in the open configuration, the first and second egress paths are both at least the required minimum width for emergency passenger egress from the minisuite.

In some embodiments, when the rear intermediate door is stuck in a closed configuration and the forward intermediate and outer doors are in the open configuration, the first and second egress paths are both at least the required minimum width for emergency passenger egress from the minisuite.

In some embodiments, when the rear outer door is stuck in a closed configuration and the forward intermediate and outer doors are in the open configuration, the first and second egress paths are both at least the required minimum width for emergency passenger egress from the minisuite.

In some embodiments, the forward inner, intermediate, and outer doors are all of a first uniform length while the rear inner, intermediate, and outer doors are all of a second uniform length.

In some embodiments, the second uniform length of the rear doors is shorter than the first uniform length of the forward doors.

In some embodiments, the forward inner, intermediate, and outer doors are all substantially parallel to a first plane, while the rear inner, intermediate, and outer doors are all substantially parallel to a second plane.

In some embodiments, the second plane parallel to the rear doors is substantially perpendicular to the first plane parallel to the forward doors.

In some embodiments, the inner doors, intermediate doors, and outer doors are all aligned in a continuous curve.

In some embodiments, the forward outer door and/or rear outer door include handles for transitioning the outer doors between their open and closed configurations, the door operable by cabin crewmembers from the outside aisle.

In some embodiments, the inner, intermediate, and outer doors all have outer surfaces facing into the outer aisle and inner surfaces facing into the minisuite, the inner rails and outer rails set into the outer surfaces and the inner sliders and outer sliders attached to the inner surfaces.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Figure 1:
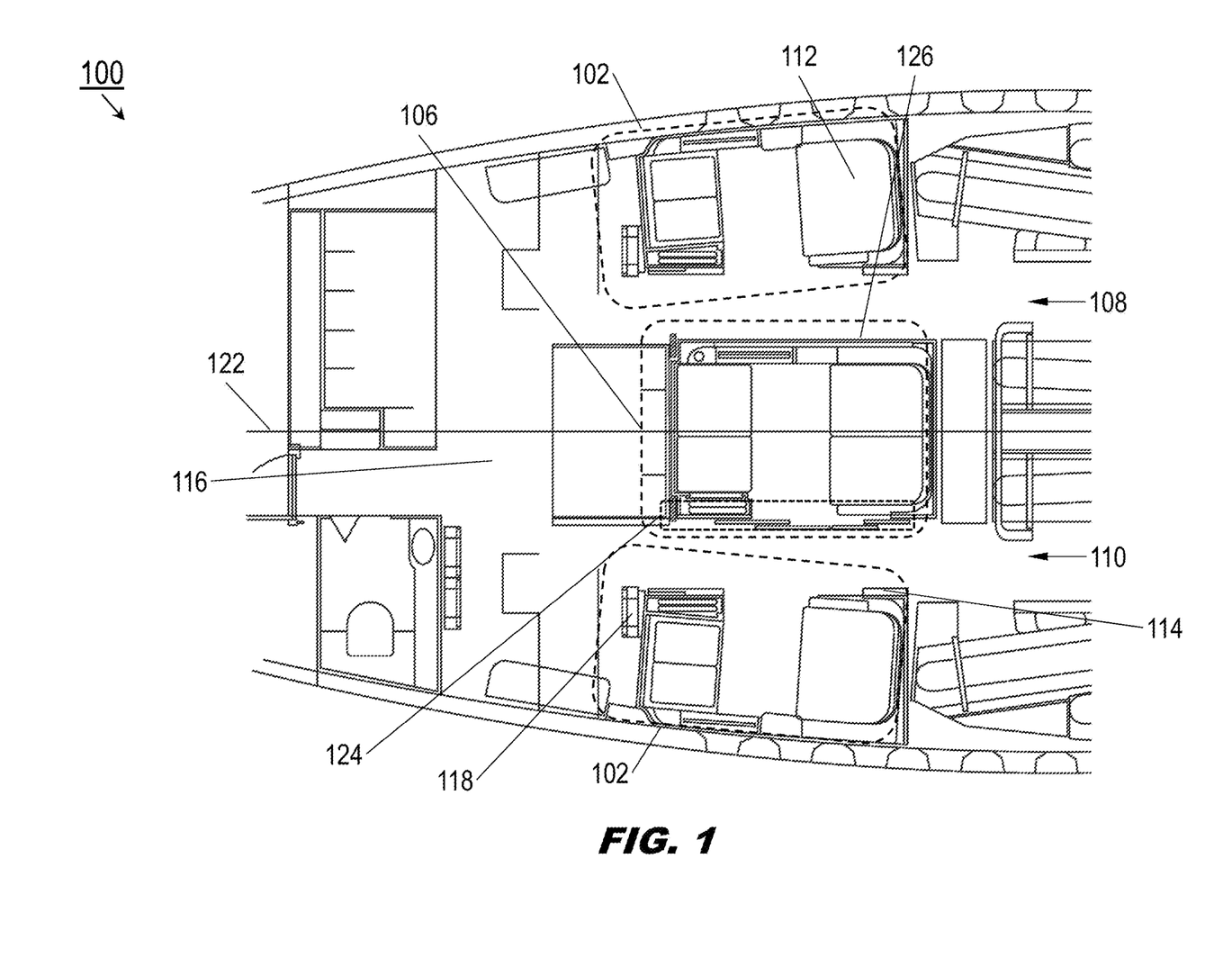
FIG. 1 is an overhead view of an aircraft cabin including a passenger compartment with a modular multiple-egress door assembly according to example embodiments of this disclosure.
Figure 2:
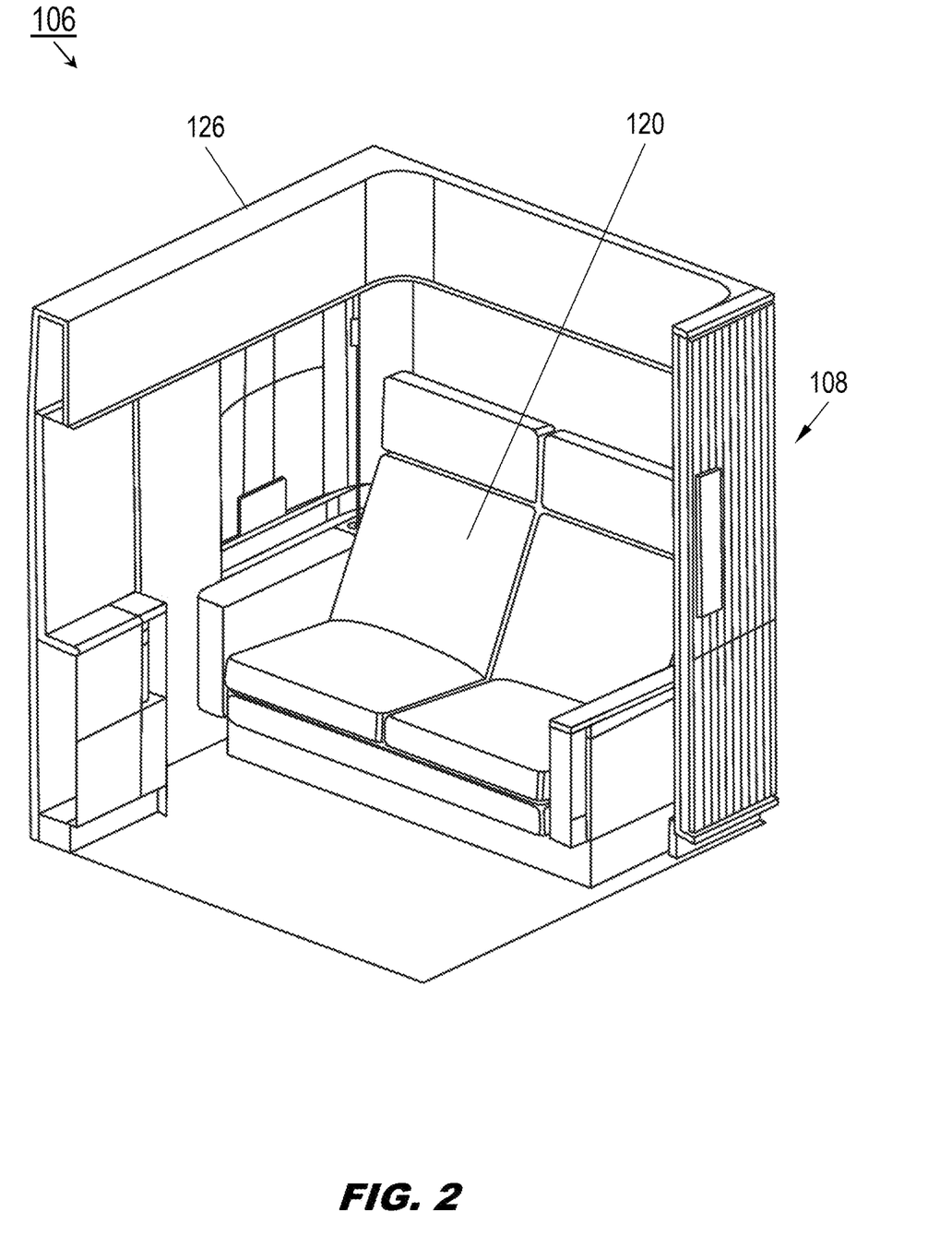
FIG. 2 is an isometric view of the passenger compartment of FIG. 1.

FIGS. 1 and 2—Minisuite, Generally

Referring to FIGS. 1 and 2, an aircraft cabin 100 is disclosed. The aircraft cabin 100 may include single-occupancy minisuites 102, 104; dual-occupancy minisuite 106; and aisles 108, 110.

For example, single- and dual-occupancy minisuites 102, 104 may include, e.g., high-wall suites or other passenger compartments or environments partially enclosed or enclosable from the aircraft cabin 100 via doors, screens, walls, and/or partitions. Single-occupancy minisuites 102, 104 may be commonly found on larger or widebody aircraft, e.g., accommodating business-class, first-class, or other premium class passengers. For example, the single-occupancy minisuites 102, 104 may provide premium passenger seating 112 for a single passenger partially enclosed from the aircraft cabin 100 by partitions 114. The premium passenger seating 112 may be convertible into a bed, e.g., for long-haul or overnight flights.

In embodiments, the partitions 114 may be distinct from bulkheads or floor-to-ceiling walls in that the partitions may be of limited height above the floor 116 of the aircraft cabin. For example, the height of the partitions 114 may be limited to provide a direct view into the single-occupancy minisuites 102, 104 for cabin crewmembers of standard height, e.g., either standing in the aisles 108, 110 or seated in a cabin attendant seat 118 (CAS) mounted in the aircraft cabin 100. "Direct view" refers to allowing the cabin crewmembers to observe the interior of the single-occupancy minisuites 102, 104, and the demeanor and well-being of the occupying passengers, particularly during taxi, takeoff and landing (TTL) flight phases. The partitions 114 may be capable of fully enclosing the passenger seating 112 and occupying passenger subject to the limited height of the partitions; alternatively or additionally, certain partitions may be required to be kept in an open or partially open configuration during TTL phases to provide a direct view to cabin crew.

In embodiments, referring also to FIG. 2, the dual-occupancy minisuite 106 may be implemented and may function similarly to the single-occupancy minisuites 102, 104, except that the dual-occupancy minisuite 106 may include a dual-occupancy premium passenger seat 120 configured to accommodate two passengers. Similarly to the premium passenger seating 112, the dual-occupancy premium passenger seat 120 may be convertible into a resting or sleeping berth for the occupying passengers.

In some embodiments, the dual-occupancy minisuite 106 may be disposed in the center of the aircraft cabin 100 (e.g., relative to the longitudinal axis 122 of the aircraft). For example, the occupying passengers may access the dual-occupancy minisuite 106 from the aisle 110 via a modular multiple-egress door assembly 124. However, the dual-occupancy minisuite may be separated from the aisle 108 by a fixed partition 126.

Current United States and European aviation regulations prohibit the use of dual-occupancy suites on commercial aircraft. For example, the relevant regulations provide that only single occupancy of a minisuite is permitted during TTL phases. Further, any minisuite must not provide an egress path (e.g., a dedicated escape route from the minisuite to an aisle 108, 110 of the aircraft cabin 100) for any passenger other than its single occupant. The minisuite must provide an egress path sufficient for evacuation into the aisle 108, 110 even in the event that an access door or movable access partition of the minisuite jams in a closed position.

In embodiments, the dual-occupancy minisuite 106 may safely accommodate two passengers by incorporating a modular multiple-egress door assembly 124 capable of providing independent egress paths to both occupying passengers, even in the event of a jammed door panel, and thereby complying with, or achieving equivalent compliance with, all applicable regulations or special conditions relevant to the deployment of minisuites in the aircraft cabin 100.

Figure 3A:
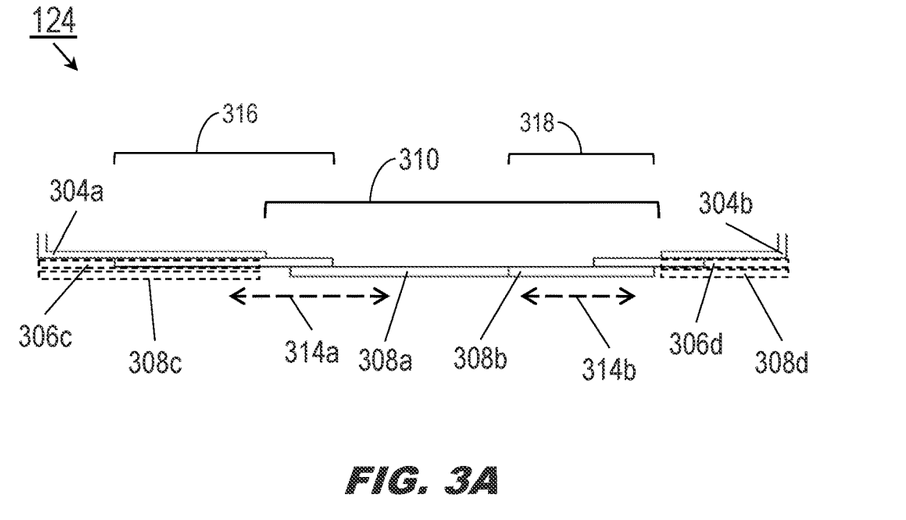
FIG. 3A is an overhead view of the modular multiple-egress door assembly of FIG. 1.
Figure 3B:
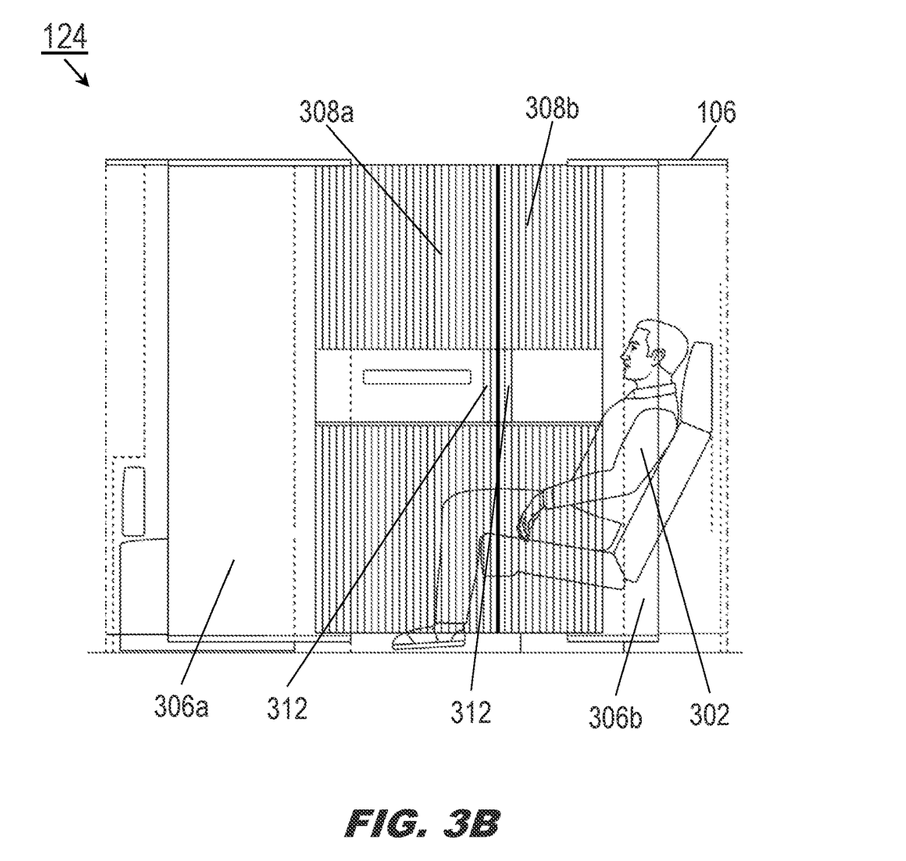
FIG. 3B is a plan view of the modular multiple-egress door assembly of FIG. 1.

FIGS. 3A and 3B—Door Assembly Detail

Referring now to FIGS. 3A and 3B, the modular multiple-egress door assembly 124 is shown.

In embodiments, the modular multiple-egress door assembly 124 may provide passenger access to the dual-occupancy minisuite 106 (and provide cabin crew a direct view into the dual-occupancy minisuite) in an open configuration and may provide enhanced privacy to the occupying passengers (302) by partitioning the dual-occupancy minisuite from the aisle (110, FIG. 1) of the aircraft cabin (100, FIG. 1) in a closed configuration.

In embodiments, the modular multiple-egress door assembly 124 may include a pair of inner doors 304a-b, a pair of intermediate doors 306a-b, and a pair of outer doors 308a-b. For example, the pair of inner doors may include a forward inner door 304a and a rear inner door 304b; in some embodiments, the inner doors 304a-b may be fixed panels defining an exterior partition of the dual-occupancy minisuite 106 and defining, between their fixed positions, an egress gap 310 between them.

In embodiments, the pair of intermediate doors may likewise include a forward intermediate door 306a and a rear intermediate door 306b (e.g., "forward" and "rear" relative to the egress gap 310, although the forward and rear intermediate doors may also be so oriented relative to the forward and aft ends of the aircraft cabin 100) and the pair of outer doors may include a forward outer door 308a and a rear outer door 308b (e.g., proximate to the aisle 110).

In embodiments, the inner doors 304a-b, intermediate doors 306a-b, and outer doors 308a-b may collectively have a fully closed configuration, whereby the dual-occupancy minisuite 106 (and its occupying passengers 302) is maximally partitioned from the aisle 110 and/or the aircraft cabin 100. Similarly, the inner doors 304a-b, intermediate doors 306a-b, and outer doors 308a-b may collectively have a fully open configuration, wherein the forward intermediate and outer doors 306a, 308a are substantially aligned (306c, 308c) with the forward inner door 304a and the rear intermediate and outer doors 306b, 308b are substantially aligned (306d, 308d) with the rear inner door 304b. In some embodiments, the forward inner, intermediate, and outer doors 304a, 306a, 308a are all of a uniform length 316 and the rear inner, intermediate, and outer doors 304b, 306b, 308b are all of a uniform length 318 less than the uniform length of the forward doors. When in the fully open configuration, maximum access to the dual-occupancy minisuite 106 may be provided via the full egress gap 310.

In embodiments, the modular multi-egress door assembly 124 may be transitioned between the fully open and fully closed configurations described above by translating the forward and rear outer doors 308a-b relative to the forward and rear intermediate doors 306a-b, and the forward and rear intermediate doors relative to the forward and rear inner doors 304a-b. For example, the forward and rear outer doors 308a-b may incorporate door handles 312 operable from the aisle 110 (e.g., by cabin crewmembers as provided for by applicable regulations). The door handles 312 may allow the forward and rear outer doors 308a-b to translate laterally (314a) as described below, translating outward toward the forward and rear intermediate doors 306a-b; the intermediate doors may similarly transition laterally with the outer doors until reaching the fully open alignment (306c-d, 308c-d) with the forward and rear inner doors 304a-b. Similarly, the fully open forward and rear outer doors 308a-b may be translated (314b) via the door handles 312 from the fully open alignment toward the fully closed alignment, wherein the forward and rear outer doors may extend across the egress gap 310 substantially adjacent to each other.

Figure 4:
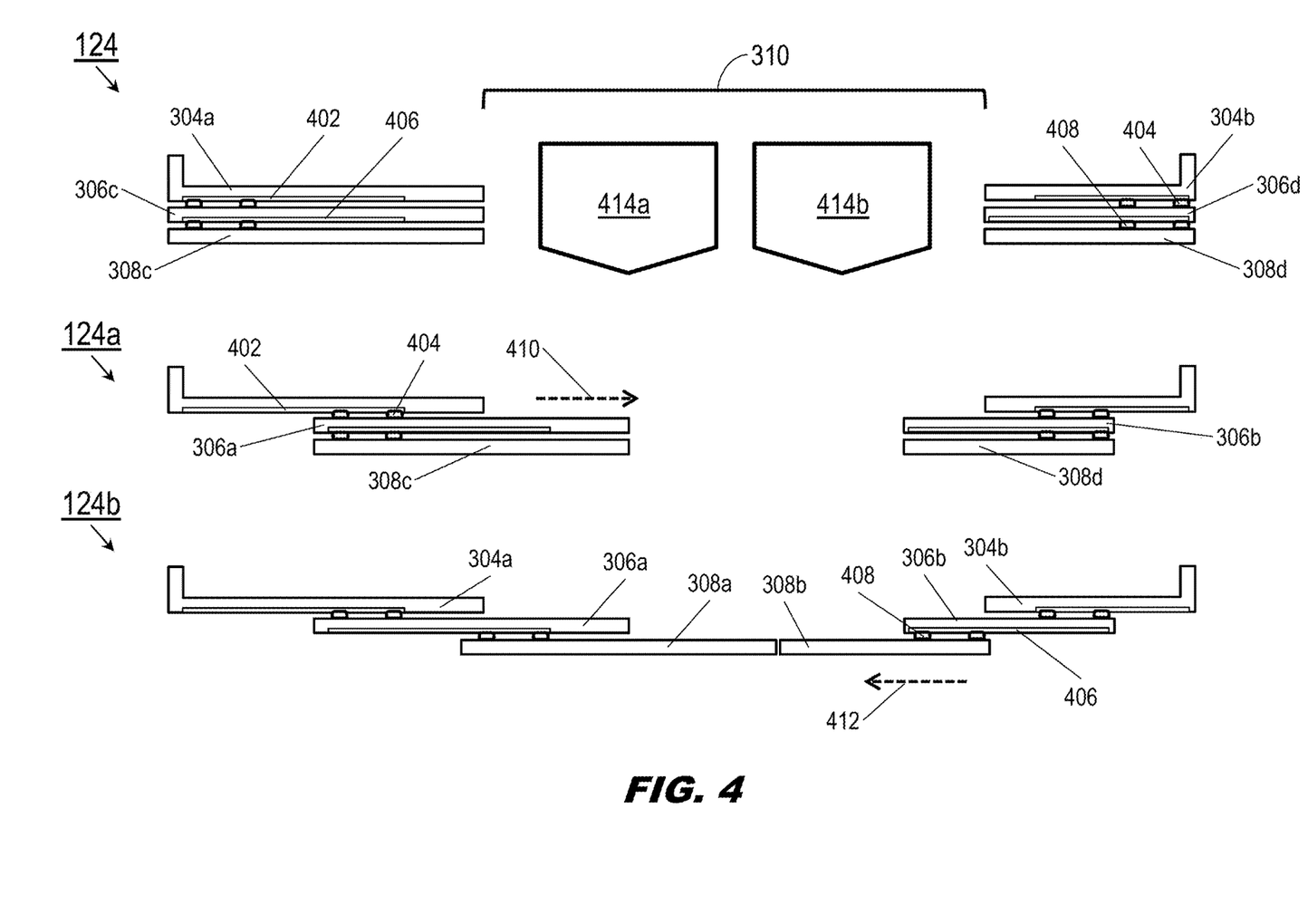
FIG. 4 is an overhead view of the modular multiple-egress door assembly of FIG. 1 in open, partially open, and closed configurations.

FIG. 4—Door Assembly Mechanics

Referring now to FIG. 4, the modular multiple-egress door assembly 124 is shown. The modular multiple-egress door assembly 124 may include inner rails 402, inner sliders 404, outer rails 406, and outer sliders 408.

In embodiments, the component doors of the modular multiple-egress door assembly 124 (e.g., the forward and rear intermediate doors 306c-d and forward and rear outer doors 308c-d) may be transitioned between the fully open configuration and a fully closed configuration (124b; forward and rear intermediate doors 306a-b and forward and rear outer doors 308a-b) via the door handles (312, FIG. 3B) operable from the aisle (110, FIG. 1). For example, the inner sliders 404 may be fixed to an inner surface (e.g., proximate to or facing the interior of the dual-occupancy minisuite (106, FIG. 3B). The inner sliders 404 may transition laterally (410) along inner rails 402 set into an exterior surface (e.g., facing the aisle 110) of the forward and rear inner doors 304a-b. Each of the forward and rear inner doors 304a-b may have one, two, or more than two inner rails 402 extending substantially parallel to each other (e.g., and to the floor (116, FIG. 1) of the aircraft cabin (100, FIG. 1)).

In embodiments, the modular multiple-egress door assembly 124a may be implemented and may function similarly to the modular multiple-egress door assembly 124, except that the intermediate doors 306c-d may be transitioned such that they maximally extend (306a-b) across the egress gap 310. For example, the intermediate doors 306c-d may (similarly to the inner rails 402 of the inner doors 304a-b) incorporate outer rails 406 extending laterally and partially across the exterior surface of the intermediate doors. Similarly to the intermediate doors 306c-d, the outer doors 308c-d may incorporate outer sliders 408 attached to their interior surface, the outer sliders capable of lateral translation (412) along the outer rails 406.

In embodiments, as the modular multiple-egress door assembly 124a is partially closed, and the forward and rear intermediate doors 306a-b are transitioned into the egress gap 310, the forward and rear outer doors 308c-d may each transition in alignment with the corresponding forward and rear intermediate doors. Once the intermediate doors 306a-b maximally extend across the egress gap 310 (as shown by the modular multiple egress door assemblies 124a-b), the forward and rear outer doors 308c-d may continue to be transitioned across the egress gap (e.g., as the outer sliders 408 translate laterally (412) along the outer rails 406) until the forward and rear outer doors 308a-b are substantially adjacent to each other and the modular multiple-egress door assembly 124b is in the fully closed configuration.

In embodiments, when the modular multiple-egress door assembly 124 is in the fully open configuration, the egress gap 310 is sufficiently wide as to provide within its space two emergency egress paths 414a-b (e.g., Emergency Passage Feature (EPF)) from the dual-occupancy minisuite 106 into the aisle 110. For example, each egress path 414a-b is of at least minimum required width (e.g., 15 inches (~38.1 cm), as provided for by United States FAA and European EASA regulations) to allow emergency egress by an occupying passenger (302, FIG. 3B), independently of and distinct from the other egress path.

Figure 5A:
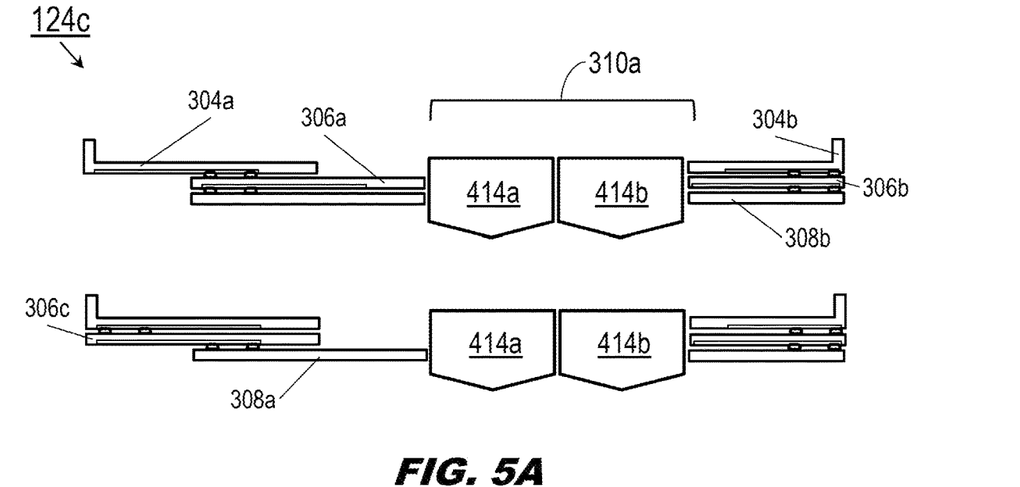
FIGS. 5A and 5B are respectively overhead and plan views of the modular multiple-egress door assembly of FIG. 1 in a first stuck configuration.
Figure 5B:
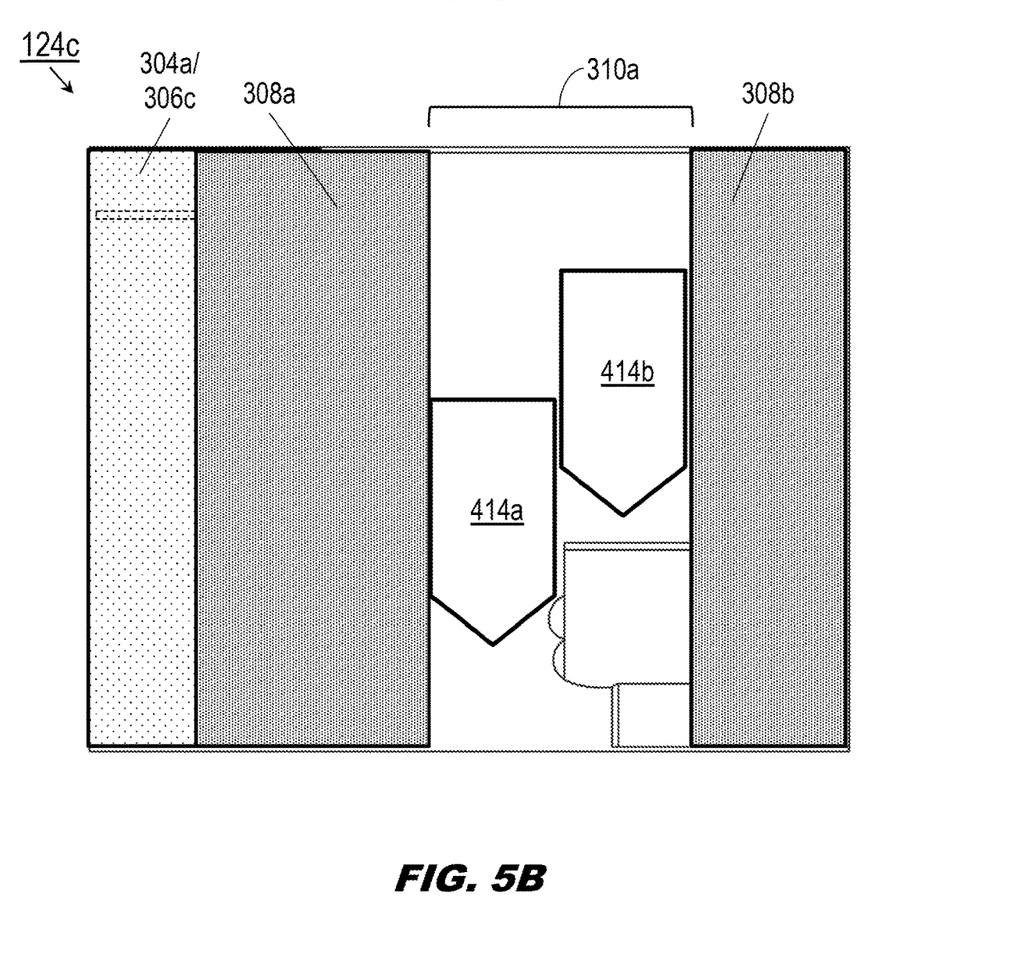

FIG. 5A/B—EPF with Jammed Forward Doors

Referring to FIGS. 5A and 5B, the modular multiple-egress door assembly 124c may be implemented and may function similarly to the modular multiple-egress door assemblies 124, 124a-b of FIG. 4, except that with respect to the modular multiple-egress door assembly 124c, either the forward intermediate door 306a may become jammed in a closed position (e.g., relative to the forward inner door 304a, as shown above in FIG. 5A), or the forward outer door 308a may become jammed in a closed position (e.g., relative to the fully open forward intermediate door 306c, as shown below in FIG. 5A).

In embodiments, the inner doors 304a-b, intermediate doors 306a-d, and outer doors 308a-b may be proportioned such that when either the forward outer door 308a or the forward intermediate door 306a is jammed as shown by FIGS. 5A and 5B respectively, the remaining egress gap 310a between the jammed forward intermediate or outer door and the rear inner, intermediate, and outer doors 304b, 306b, 308b is sufficiently wide as to provide the two emergency egress paths 414a-b independent of each other, one emergency egress path for each occupying passenger (302, FIG. 3B).

Figure 6A:
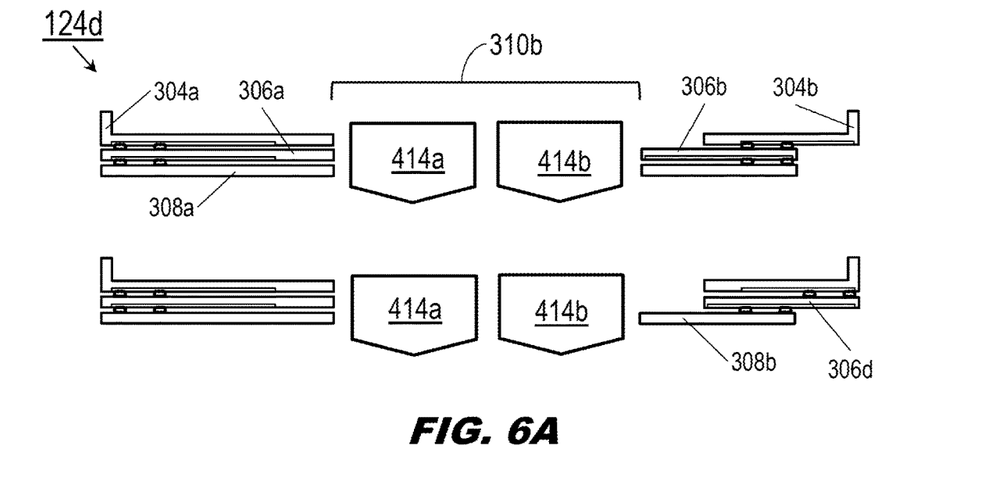
FIGS. 6A and 6B are respectively overhead and plan views of the modular multiple-egress door assembly of FIG. 1 in a second stuck configuration.
Figure 6B:
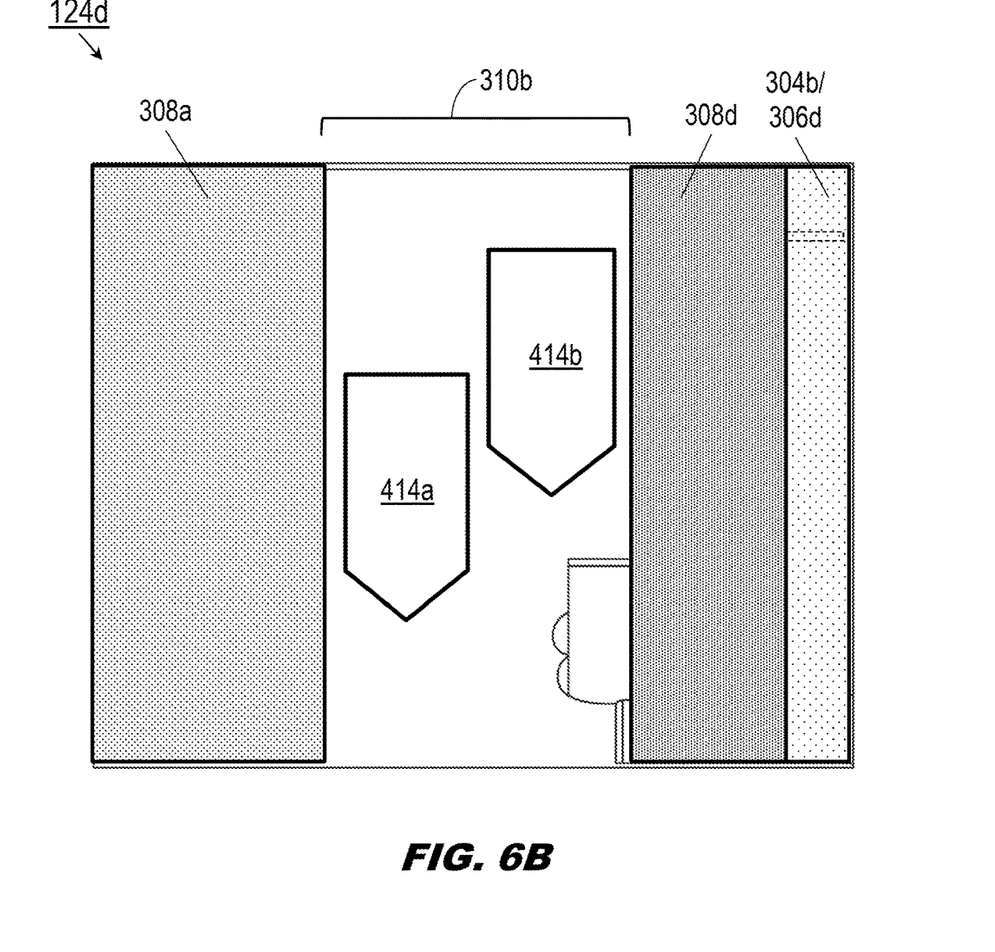

FIGS. 6A/B—EPF with Jammed Rear Doors

Referring to FIGS. 6A and 6B, the modular multiple-egress door assembly 124d may be implemented and may function similarly to the modular multiple-egress door assembly 124c of FIGS. 5A and 5B, except that with respect to the modular multiple-egress door assembly 124d, either the rear intermediate door 306b may become jammed in a closed position (e.g., relative to the rear inner door 304b, as shown above in FIG. 6A), or the rear outer door 308b may become jammed in a closed position (e.g., relative to the rear intermediate door 306d, as shown below by FIG. 6A).

In embodiments, similarly to the modular multiple-egress door assembly 124c, the remaining egress gap 310b between the jammed rear intermediate or outer door (306d, 308d) and the forward inner, intermediate, and outer doors 304a, 306a, 308a may be sufficiently wide as to provide the two emergency egress paths 414a-b independent of each other, one emergency egress path for each occupying passenger (302, FIG. 3B). It should be noted that, for example, due to differences in proportion between the forward doors (304a, 306a, 308a) and rear doors (304b, 306b/d, 308d), the egress gaps 310a-b may differ in minimum width. In some embodiments, the egress gaps 310a-b may be larger than the minimums shown by FIGS. 5A through 6B (e.g., if the outer doors 308a-d or intermediate doors 306a-b should become jammed in a partially closed position, a wider egress gap may result).

Figure 7A:
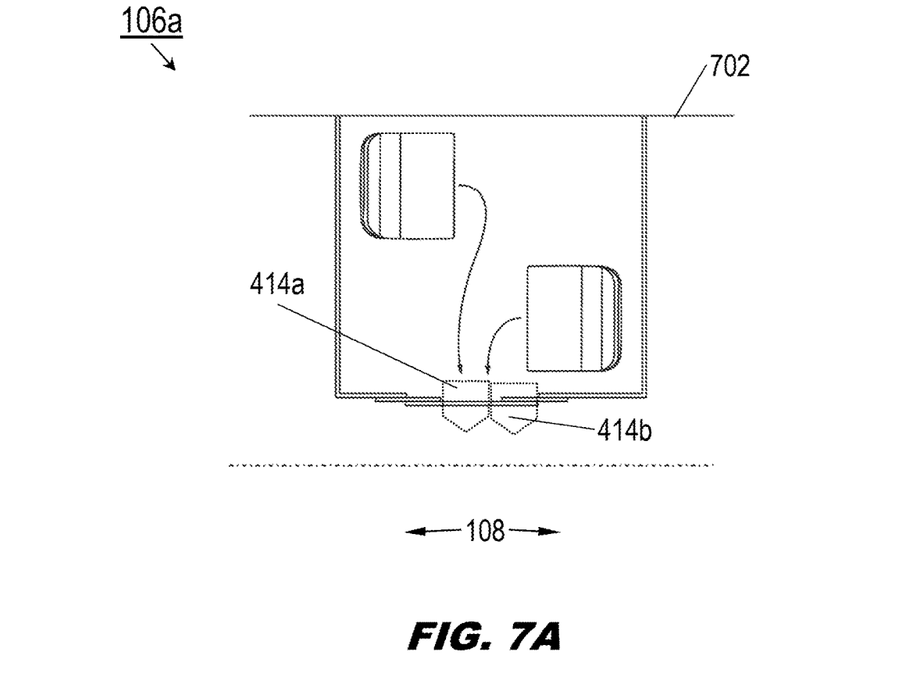
FIGS. 7A and 7B are overhead views of the passenger compartment and modular multiple-egress door assembly of FIG. 1 in center-aisle and sidewall-adjacent configurations.
Figure 7B:
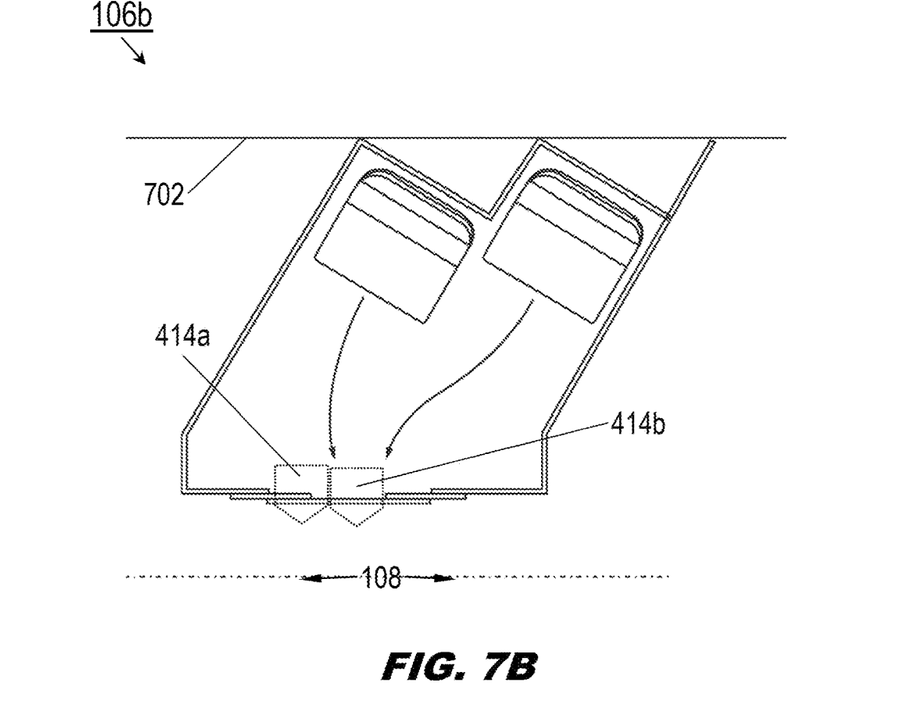

FIGS. 7A/B—Sidewall Adjacent Configurations

Referring to FIGS. 7A and 7B, the dual-occupancy minisuites 106a-b may be implemented and may function similarly to the dual-occupancy minisuite 106 of FIG. 1, except that the dual-occupancy minisuites 106a-b may be set against a sidewall 702 (e.g., bulkhead) of the aircraft cabin (100, FIG. 1), the emergency egress paths 414a-b leading into an aisle 108 (or 110, FIG. 1).

Figure 8A:
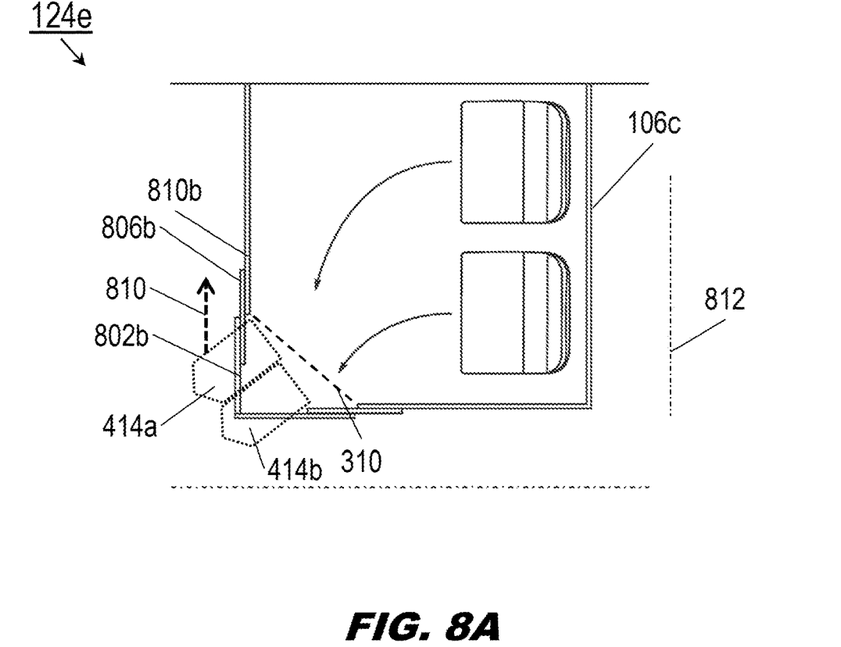
FIGS. 8A and 8B are overhead views of the passenger compartment and modular multiple-egress door assembly of FIG. 1 in center-aisle and sidewall-adjacent configurations.
Figure 8B:
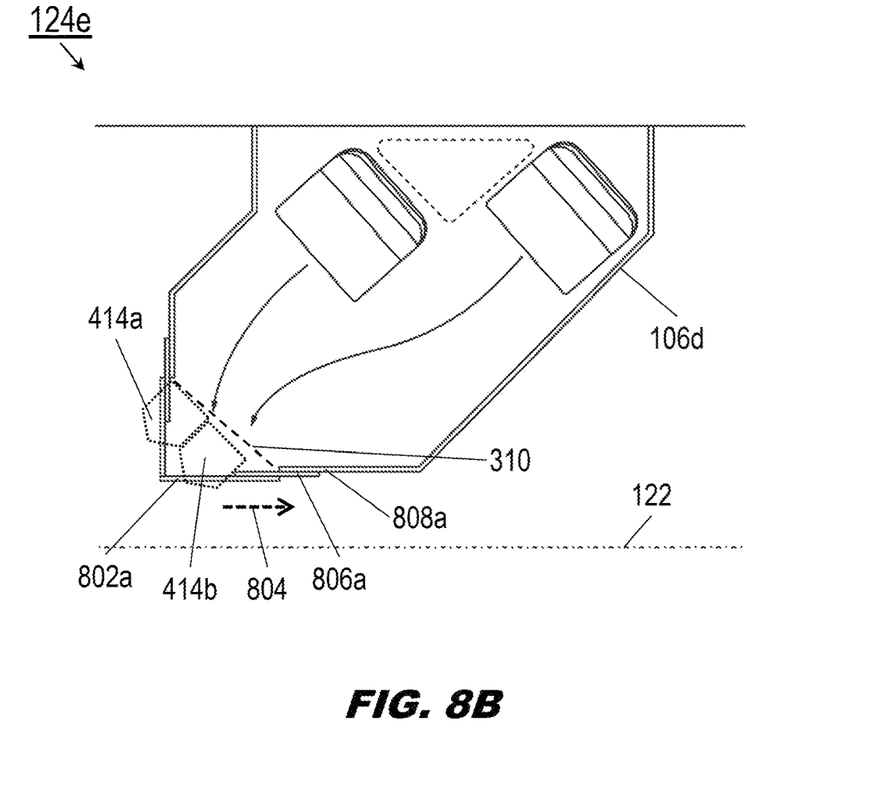

FIGS. 8A/B—Orthogonal Door Assembly

Referring to FIGS. 8A and 8B, the dual-occupancy minisuites 106c-d may be implemented and may function similarly to the dual-occupancy minisuites 106a-b of FIGS. 7A and 7B, except that the dual-occupancy minisuites 106c-d may incorporate a modular multiple-egress door assembly 124e.

In embodiments, the modular multiple-egress door assembly 124e may incorporate, rather than the forward and rear outer, intermediate, and inner doors (304a-d, 306a-d, 308a-d) of FIGS. 3A through 7B, a longitudinal and lateral set of doors substantially orthogonal to each other. For example, the longitudinal outer door 802a may translate (804) relative to the longitudinal intermediate door 806a (e.g., via outer sliders (408, FIG. 4) and outer rails (406, FIG. 4) substantially parallel to the longitudinal axis 122 (e.g., roll axis, line of flight) of the aircraft. Similarly, the longitudinal intermediate door 806a may translate (804) relative to the longitudinal inner door 808a (e.g., via inner sliders (404, FIG. 4) and inner rails (402, FIG. 4) substantially parallel to the longitudinal axis 122.

In embodiments, the lateral outer door 802b may translate (810) relative to the lateral intermediate door 806b, and the lateral intermediate door may translate relative to the lateral inner door 808b, substantially parallel to a lateral axis 812 of the aircraft (e.g., parallel to a pitch axis). The opening of the longitudinal and lateral door sets 802a-b, 806a-b, 808a-b may provide access to the dual-occupancy minisuites 106c-d via an egress gap 310 of sufficient width to provide for two emergency egress paths 414a-b from the dual-occupancy minisuites into the adjacent aisle 108, each emergency egress path of at least minimum required width, if one of the longitudinal intermediate door 806a, the longitudinal outer door 808a, the lateral intermediate door 806b, and the lateral outer door 808b is jammed in a closed position.

In some embodiments, the longitudinal and lateral door sets 802a-b, 806a-b, 808a-b may not be precisely aligned with the longitudinal axis 122 and the lateral axis 812, but may be substantially orthogonal to each other. Similarly, in some embodiments the longitudinal and lateral door sets 802a-b, 806a-b, 808a-b may not be precisely orthogonal to each other but may be at some other angle (e.g., an obtuse angle between 90 and 180 degrees) such that the egress gap 310 and the two emergency egress paths 414a-b are preserved.

Figure 9A:
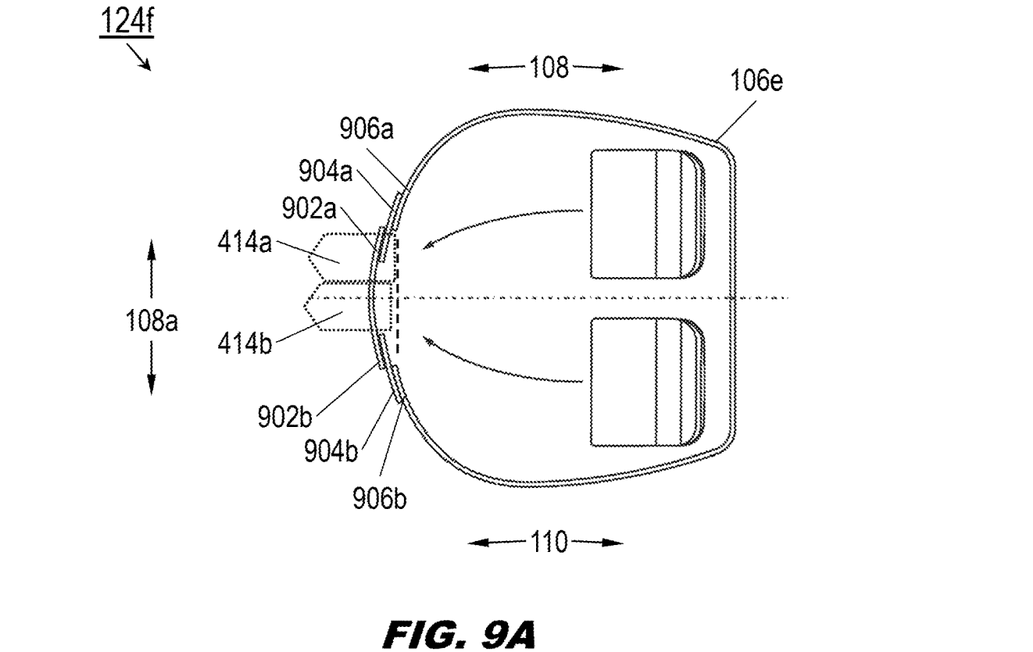
FIG. 9A is an overhead view of the passenger compartment and modular multiple-egress door assembly of FIG. 1 in a center-aisle configuration.
Figure 9B:
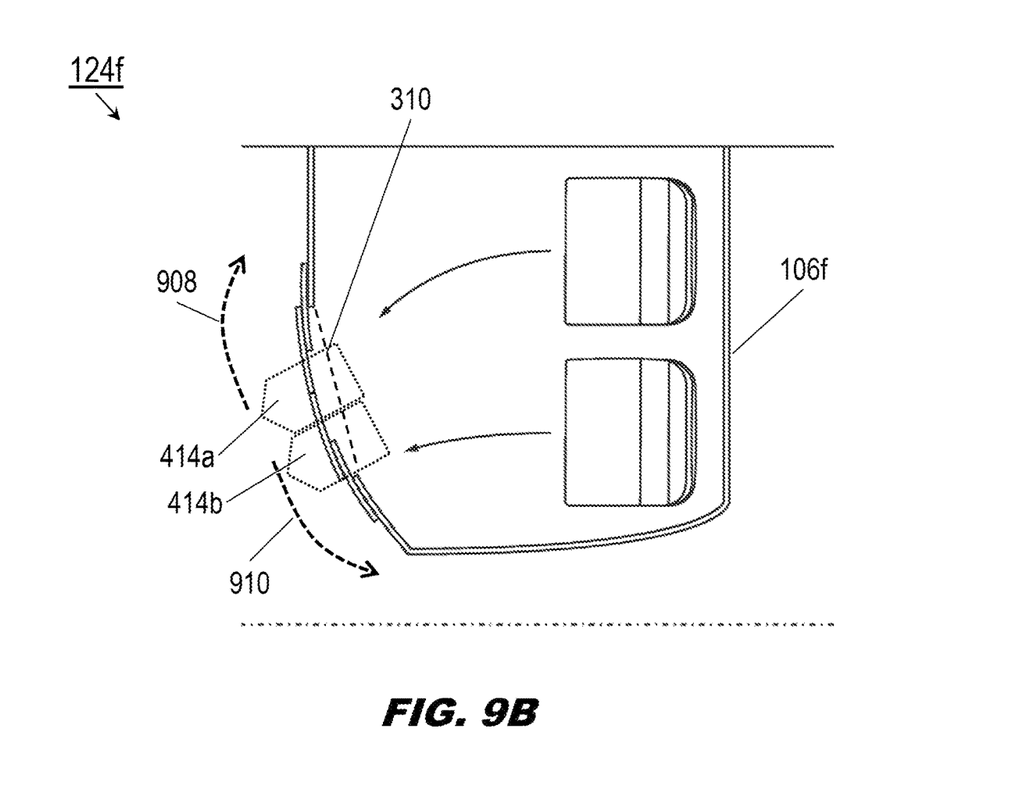
FIGS. 9B and 9C are overhead views of the passenger compartment and modular multiple-egress door assembly of FIG. 1 in sidewall-adjacent configurations.
Figure 9C:
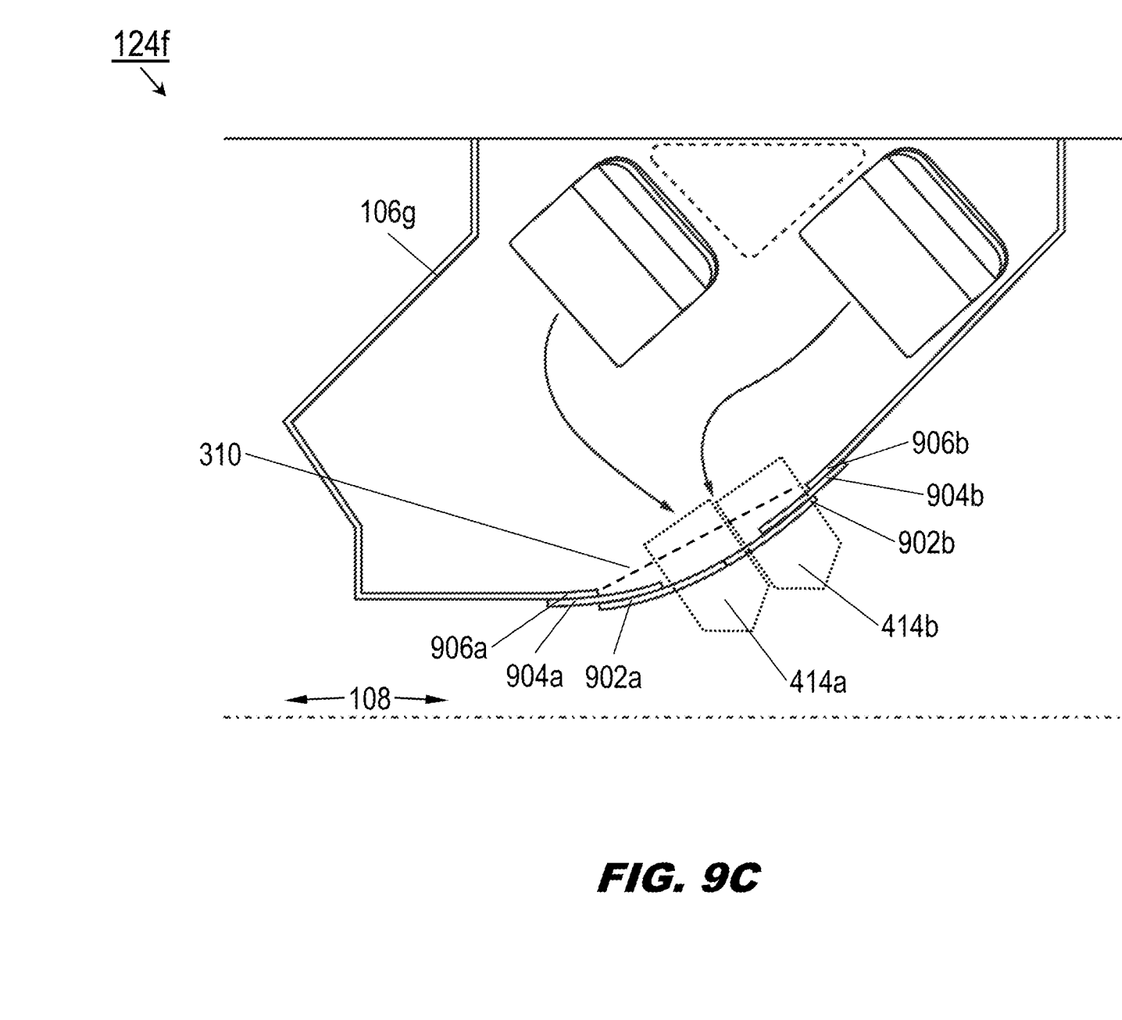

FIGS. 9A Through 9C—Curved Door Assembly

Referring now to FIGS. 9A through 9C, the dual-occupancy minisuites 106e-g may be implemented and may function similarly to the dual-occupancy minisuites 106, 106a-d of FIGS. 1 through 8B, except that the dual-occupancy minisuites 106e-g may incorporate a modular multiple-access door assembly 124f.

In embodiments, the dual-occupancy minisuite 106e may be centrally disposed in the aircraft cabin (100, FIG. 1) between the aisles 108, 110 (e.g., opening into a lateral aisle 108a), while the dual-occupancy minisuites 106f-g may be disposed adjacent to a sidewall 702.

In embodiments, the modular multiple-access door assembly 124f may incorporate left-side and right-side door sets (e.g., on either side of the egress gap 310; compare to the forward and rear door sets 304a-b, 306a-d, 308a-d of FIGS. 3A-B or the longitudinal and lateral door sets 802a-b, 806a-b, 808a-b of FIGS. 8A and 8B). For example, the left-side inner door 902a, left-side intermediate door 904a, and left-side outer door 906a may define a substantially continuous curve. The left-side outer door 906a may translate (908) relative to the left-side intermediate door 904a (e.g., via outer sliders (408, FIG. 4) and outer rails (406, FIG. 4)), and the left-side intermediate door 904a may translate relative to the left-side inner door 902a (e.g., via inner sliders 404 and inner rails 402), to provide access to the dual-occupancy minisuites 106e-g via the egress gap 310. Similarly, the right-side outer door 906a may translate (910) relative to the right-side intermediate door 904b, and the right-side intermediate door may translate relative to the right-side inner door 902b.

In embodiments, the egress gap 310 is of sufficient width to provide the emergency egress paths 414a-b of at least minimum required width, even when one of the left-side outer door 906a, the left-side intermediate door 904a, the right-side outer door 906b, and the right-side intermediate door 906b is jammed in a closed position.

CONCLUSION

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed is:

1. A dual-occupancy aircraft minisuite, comprising:
at least one partition configured for at least partially enclosing passenger seating for a first and a second passenger;
a pair of opposing inner doors fixed to the at least one partition and separated by an egress gap configured for passenger egress from the dual-occupancy aircraft minisuite into an aisle of an aircraft cabin,
the egress gap including at least 1) a first egress path configured to provide the first passenger access to the aisle and 2) a second egress path configured to provide the second passenger access to the aisle, the second egress path adjacent to and independent of the first egress path, wherein each egress path of the egress gap is at least a required minimum width, and
the pair of opposing inner doors including a forward inner door and a rear inner door, each inner door having one or more inner rails set thereinto and one or more inner sliders slidably set into the inner rails;
a pair of opposing intermediate doors including a forward intermediate door and a rear intermediate door, each intermediate door having one or more outer rails set thereinto and one or more outer sliders slidably set into the outer rails,
each intermediate door slidably coupled to the corresponding inner door via the one or more inner sliders,
each intermediate door having an open configuration wherein the intermediate door is aligned with the corresponding inner door and a closed configuration wherein the intermediate door extends into the egress gap, each intermediate door capable of translation between the open and closed configurations via the one or more inner sliders,
the pair of opposing intermediate doors configured to maintain the required minimum width of each egress path when one of the opposing intermediate doors are stuck in either of the open or the closed configuration,
and
the pair of opposing intermediate doors configured to maintain the required minimum width of each egress path when one of the opposing intermediate doors is stuck in the open configuration and the other opposing intermediate door is stuck in the closed configuration;
and
a pair of opposing outer doors including a forward outer door and a rear outer door,
each outer door slidably coupled to the corresponding intermediate door via the one or more outer sliders,
each outer door having an open configuration wherein the outer door is aligned with the corresponding intermediate door and a closed configuration wherein the outer door extends into the egress gap, the forward and rear outer doors mutually adjacent when in the closed configuration,
each outer door capable of translation between the open and closed configurations via the one or more outer sliders.

2. The dual-occupancy aircraft minisuite of claim 1, wherein:

when the forward intermediate door is stuck in the closed configuration and the rear intermediate and rear outer doors are in the open configuration, the first egress path corresponds to the first passenger and the second egress path corresponds to the second passenger.

3. The dual-occupancy aircraft minisuite of claim 1, wherein:
when the forward outer door is stuck in the closed configuration and the rear intermediate and rear outer doors are in the open configuration, the first egress path corresponds to the first passenger and the second egress path corresponds to the second passenger.

4. The dual-occupancy aircraft minisuite of claim 1, wherein:
when the rear intermediate door is stuck in the closed configuration and the forward intermediate and forward outer doors are in the open configuration, the first egress path and the second egress path are each no less than the required minimum width.

5. The dual-occupancy aircraft minisuite of claim 1, wherein:
when the rear outer door is stuck in the closed configuration and the forward intermediate and forward outer doors are in the open configuration, the first egress path and the second egress path are each no less than the required minimum width.

6. The dual-occupancy aircraft minisuite of claim 1, wherein:
the forward inner door, the forward intermediate door, and the forward outer door are all associated with a first length;
and
the rear inner door, the rear intermediate door, and the rear outer door are all associated with a second length.

7. The dual-occupancy aircraft minisuite of claim 6, wherein the first length is greater than the second length.

8. The dual-occupancy aircraft minisuite of claim 1, wherein:
the forward inner door, the forward intermediate door, and the forward outer door are substantially parallel to a first axis;
and
the rear inner door, the rear intermediate door, and the rear outer door are all substantially parallel to a second axis.

9. The dual-occupancy aircraft minisuite of claim 8, wherein the second axis is substantially perpendicular to the first axis.

10. The dual-occupancy aircraft minisuite of claim 1, wherein the pair of inner doors, the pair of intermediate doors, and the pair of outer doors are aligned in a continuous curve.

11. The dual-occupancy aircraft minisuite of claim 1, wherein at least one of the pair of outer doors includes a handle for transitioning the outer door between the open and closed configurations, the handle configured for operation from the aisle.

12. The dual-occupancy aircraft minisuite of claim 1, wherein
the pair of inner doors, the pair of intermediate doors, and the pair of outer doors are all associated with an outer face oriented toward the aisle and an inner face opposite the outer face;
the inner rails and the outer rails are disposed within the outer face;
and
the inner sliders and the outer sliders are attached to the inner face.

* * * * *